F. W. DARLINGTON.
SELF CONTAINED PORTABLE FOUNTAIN.
APPLICATION FILED NOV. 24, 1916.

1,228,186.

Patented May 29, 1917.

INVENTOR:
F. W. Darlington
BY
Chamberlin & Freudenreich,
ATTORNEYS.

UNITED STATES PATENT OFFICE.

FREDERIC W. DARLINGTON, OF CHICAGO, ILLINOIS.

SELF-CONTAINED PORTABLE FOUNTAIN.

1,228,186.  Specification of Letters Patent.  Patented May 29, 1917.

Application filed November 24, 1916. Serial No. 133,125.

*To all whom it may concern:*

Be it known that I, FREDERIC W. DARLINGTON, a citizen of the United States, residing at Chicago, county of Cook, State of Illinois, have invented a certain new and useful Improvement in Self-Contained Portable Fountains, and declare the following to be a full, clear, and exact description of the same, such as will enable others skilled in the art to which it pertains to make and use the same, reference being had to the accompanying drawings, which form a part of this specification.

My invention relates to that type of power operated electric fountain which is a complete small self-contained portable unit adapted to be placed anywhere where the effect of a small fountain will be pleasing; and it has for its principal object to produce a construction in which beauty will not be sacrificed for the purpose of carrying out necessary mechanical functions. Or, stated in another way, my invention may be said to have for its object to produce a small self contained fountain the appearance of which will not be controlled by or even dependent upon the mere mechanical functions of the water circulating apparatus.

One of the objectionable features of all small fountains of which I am aware is the destruction of the inner lines of the bowl of the fountain by water pipes lying in the bowl or basin and, viewed in one of its aspects, my invention may be said to have for its object to produce a simple fountain adapted to emit any desired number of jets or sprays, distributed in any desired way, without employing pipes or conduits within the bowl or basin.

In carrying out my invention, I proceed somewhat along the lines of the fountain disclosed in my prior Patent #675,883 of June 11, 1901; with material modifications, however, to meet the requirements of the small portable unit; and therefore, viewed in one of its aspects, my invention may be said to have for its object a remodeling of the fountain of the construction of my aforesaid patent to adapt it to small units.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figures 1, 2, 3:
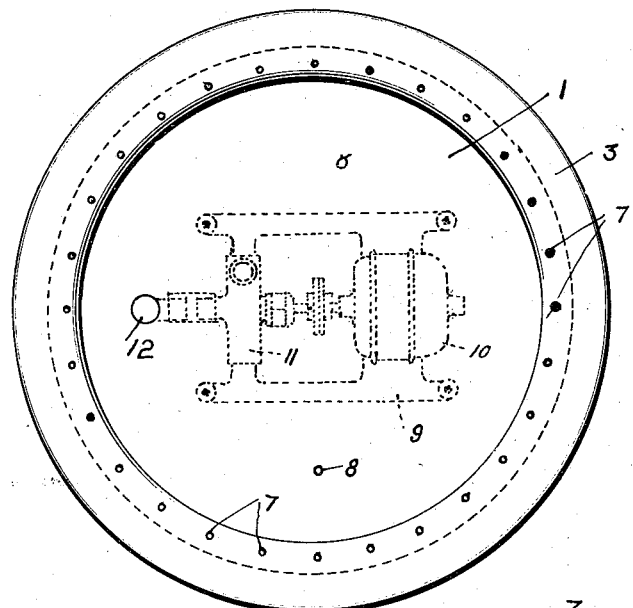
Figure 1 is a top plan view of a fountain arranged in accordance with a preferred form of my invention.
Fig. 2 is a central vertical section through the fountain of Fig. 1, the motor and pump being shown in elevation.
Fig. 3 is a view similar to Fig. 2, illustrating a modification.

My invention, generally speaking, consists simply of a simple bowl or basin of any desired design, containing within itself a conduit or passage from which project little nozzles adapted to emit jets or sprays; an electrically driven pump mounted on the bottom of the bowl or basin and lying beneath the same; together with a suction pipe leading from the bowl or basin to the pump and a supply pipe leading from the pump to the water conduit or passage contained within the bowl or basin. There are thus no exposed pipes to detract from the beauty of the basin which may be given any attractive shape that fancy may dictate.

It is desirable, of course, to make the weight of a small fountain as low as possible and, in order that the most artistic effects may be obtained it is necessary that the basin should have the appearance as well as the reality of being light, in order to prevent it from being clumsy and unattractive. I have found that the best results from an esthetic standpoint and from a mechanical standpoint, as well, may be obtained by spinning, pressing or drawing the basin out of sheet metal in such a way as to provide it with a self contained supply conduit or passage. This may be done in various ways, two different ways being illustrated in the drawing.

Referring to Figs. 1 and 2 of the drawing, 1 and 2 represent two shallow basins of any desired shape, the basin 1 being somewhat smaller, both as to width and depth, than the basin 2. The basins are preferably provided at their upper edges with flanges, 3 and 4, respectively; the parts being so proportioned that the basin 1 may be set in the other basin with its flange resting upon the flange of the latter basin, the bottom of the inner basin being held at some distance above the bottom of the outer basin; and there being thus formed a completely inclosed space, 5, underlying the basin 1 and surrounding the sides thereof. The two basins are connected together and the space or chamber between them is concealed by securing the flanges together in any suitable way; this being conveniently accomplished by joining the free edges of the flanges together by means of any suitable rolled seam as indicated at 6.

The chamber 5 serves as a supply pipe or passage which reaches all points of the bottom and side walls of the inner basin, as well as that portion of the flange, 3, lying between the sides of the two basins. Consequently by inserting nozzles such as indicated at 7 and 8 through the walls of the inner basin and the inner portion of its flange, any desired distribution of jets or sprays may be produced when water is pumped into the chamber 5.

Secured to the underside of the outer basin is a platform, 9, from which depends a motor, 10, driving a suitable pump, 11. A suction pipe, 12, extends from the suction side of the pump through the bottoms of the two basins so as to receive water that enters the basin 1. The discharge side of the pump is connected to the chamber 5 by means of a pipe, 13, which preferably contains a valve, 14. When the pump is set in operation it discharges into the chamber 5 from which the water is forced out through the nozzles in the form of jets or sprays; the water dropping back into the basin 1 from which it is returned to the pump through the suction pipe 12. The pressure of the water may be regulated by means of the valve 14.

It will be seen that when the device is set upon a vase or jardinière large enough to admit the power plant, there is left exposed only a simple basin with its playing water, all mechanical devices by means of which the water is kept in motion being concealed.

In Fig. 3 I have illustrated a modification in which the basin, 1, is the same as the basin 1 in the other form but, instead of having a complete outer basin, there is a mere ring, 15, having a flange, 4, underlying the flange 3 of the basin 1 and having a second flange, 16, which engages with the bottom of the basin 1 and is soldered or otherwise secured thereto; the parts being so proportioned that there is formed about the basin 1 an annular passage, 17, which underlies the inner portion of the flange 3 so that nozzles, 7, distributed about this portion of the flange will receive water from the conduit or passage 17. The power plant in this arrangement is just the same as in the other. The suction pipe, 12, leads out of the bottom of the basin 1 while the discharge pipe, 18, opens into the conduit or chamber 17. The pipe 18 preferably extends through the bottom of the basin and connects with the conduit, 17, from a point within the basin; a valve, 19, being provided to control the pressure of the water.

In addition to nozzles 7 distributed about the inner edge of the flange in the basin 1 or nozzles, 8, coming up from the bottom of the inner basin, or both, I may employ a central ornament or light, as indicated at 20 in Fig. 2.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. In a self-contained fountain, a basin of sheet metal having an outwardly directed flange around the mouth thereof and an annular conduit surrounding the same and closed at the top by said flange, spraying nozzles projecting upwardly from said flange and communicating at the lower ends with the interior of said conduit, and means including a power plant hung on the under side of the basin for taking water from the basin and forcing it into said conduit.

2. In a self-contained portable fountain, a basin comprising a sheet metal basin-like member having a flange extending outwardly therefrom at the mouth thereof, a second sheet metal member surrounding the aforesaid member beneath the flange on the latter and engaging the aforesaid flange, said members being secured together to form a continuous conduit around the inner member, spraying nozzles projecting upwardly from the first mentioned flange; and means including a power plant hung on the under side of the basin for taking water from said basin-like member and forcing it into said conduit.

3. A basin for a portable fountain comprising a sheet metal basin-like member having a flange extending outwardly therefrom at the mouth thereof, a second member surrounding the aforesaid member beneath the flange on the latter and forming an annular conduit beneath said flange, and spraying nozzles projecting upwardly from said flange and communicating at their lower ends with said conduit.

4. A basin for a portable fountain comprising a sheet metal basin-like member having a flange extending outwardly therefrom at the mouth thereof, and a second sheet metal member surrounding the aforesaid member beneath the flange and forming with the latter an annular conduit, and spraying nozzles projecting upwardly from said flange and communicating at their lower ends with the interior of said conduit.

In testimony whereof, I sign this specification.

FREDERIC W. DARLINGTON.

Copies of this patent may be obtained for five cents each, by addressing the "Commissioner of Patents, Washington, D. C."